(12) United States Patent
Villagra Fuentes

(10) Patent No.: US 7,540,960 B2
(45) Date of Patent: Jun. 2, 2009

(54) METHOD AND SYSTEM FOR INOCULATING BACTERIA IN CONTAMINATED WATER USING EARTHWORM HUMUS

(75) Inventor: Alex Manuel Villagra Fuentes, 14 De Octubre 1616, Cerrillos, Santiago (CL)

(73) Assignee: Alex Manuel Villagra Fuentes, Santiago (CL)

( * ) Notice: Subject to any disclaimer, the term of this patent is extended or adjusted under 35 U.S.C. 154(b) by 0 days.

(21) Appl. No.: 11/670,894

(22) Filed: Feb. 2, 2007

(65) Prior Publication Data

US 2008/0099397 A1    May 1, 2008

Related U.S. Application Data

(60) Provisional application No. 60/855,099, filed on Oct. 26, 2006.

(51) Int. Cl.
*C02F 3/32* (2006.01)

(52) U.S. Cl. ............... 210/602; 210/617; 210/150; 210/170.08

(58) Field of Classification Search ............ 210/602, 210/617, 747, 150, 151, 170.08
See application file for complete search history.

(56) References Cited

U.S. PATENT DOCUMENTS

| | | | | |
|---|---|---|---|---|
| 681,884 | A * | 9/1901 | Monjeau | 210/602 |
| 3,894,355 | A * | 7/1975 | Carothers | 210/617 |
| 4,218,318 | A * | 8/1980 | Niimi et al. | 210/150 |
| 5,240,611 | A * | 8/1993 | Burton | 210/151 |
| 5,919,366 | A * | 7/1999 | Cameron | 210/602 |
| 7,361,268 | B2 * | 4/2008 | Ogden | 210/150 |
| 2003/0116488 | A1 * | 6/2003 | Cameron | 210/150 |
| 2004/0065610 | A1 * | 4/2004 | Shankar et al. | 210/602 |

* cited by examiner

*Primary Examiner*—Christopher Upton
(74) *Attorney, Agent, or Firm*—Perkins Coie LLP

(57) ABSTRACT

A system for treating liquids by forming bacteria flora using earthworm humus is disclosed. In some embodiments, the system includes a containment tank for receiving a contaminated liquid distributed through an opening into the tank, the containment tank further including a layer of earthworm humus through which the liquid is filtered, a medium layer for bacteria inoculation below the earthworm humus layer in the containment tank, and an inert layer below the medium layer proximate to the base of the containment tank.

23 Claims, 4 Drawing Sheets

DYNAMIC FILTER

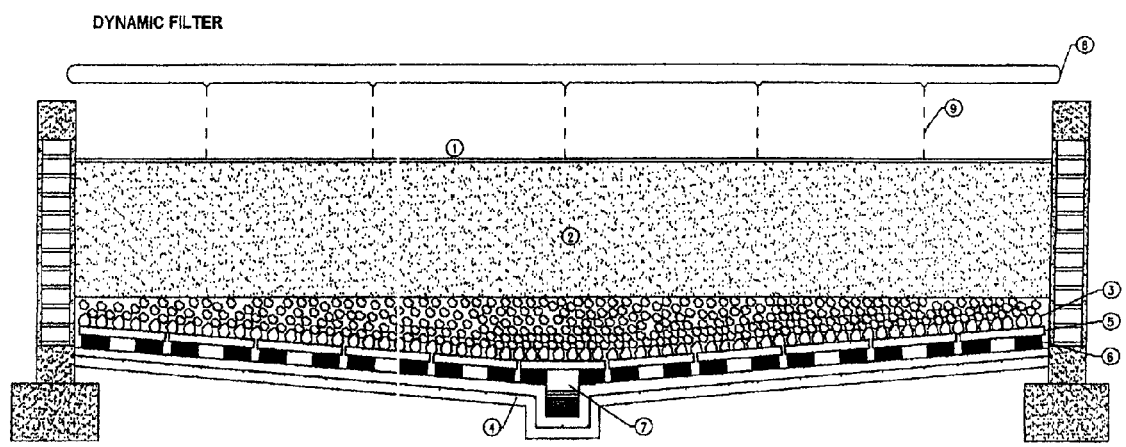
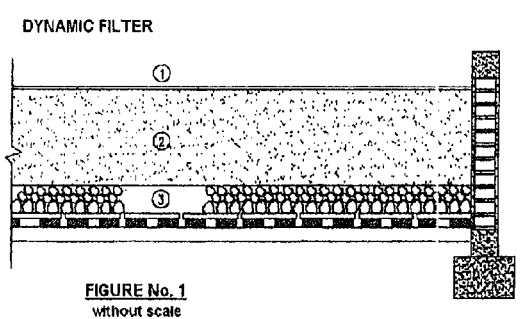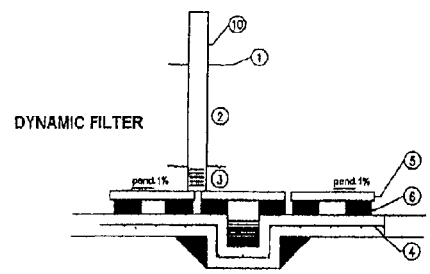

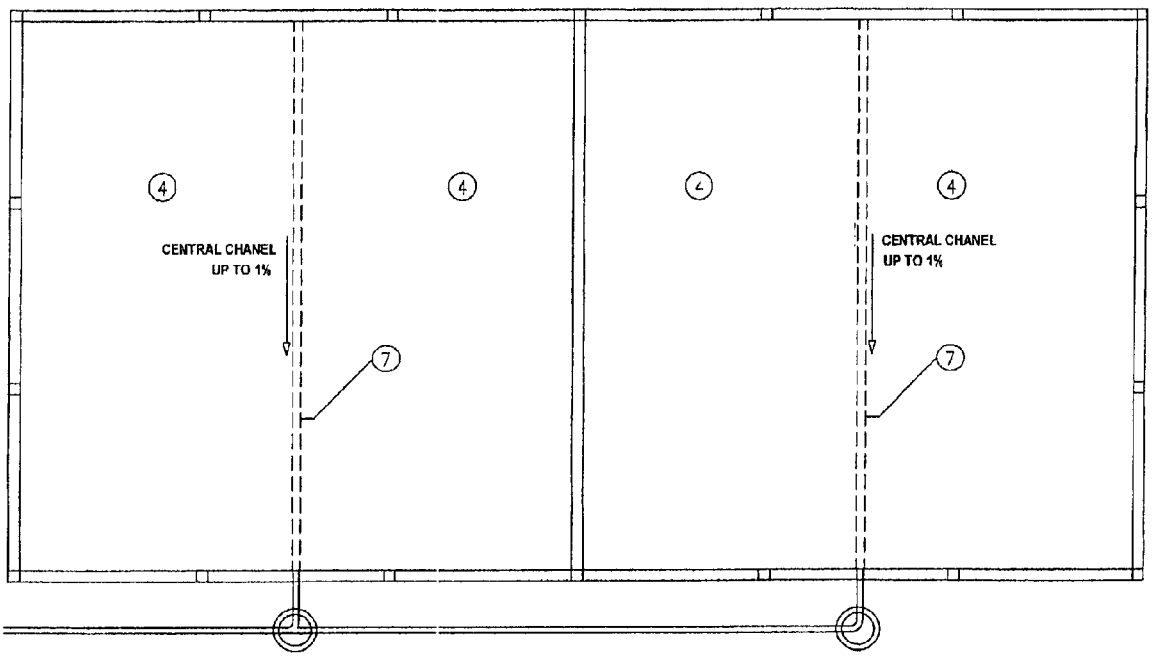
FIGURE No. 4
Plant View
SCALE/ 1:100

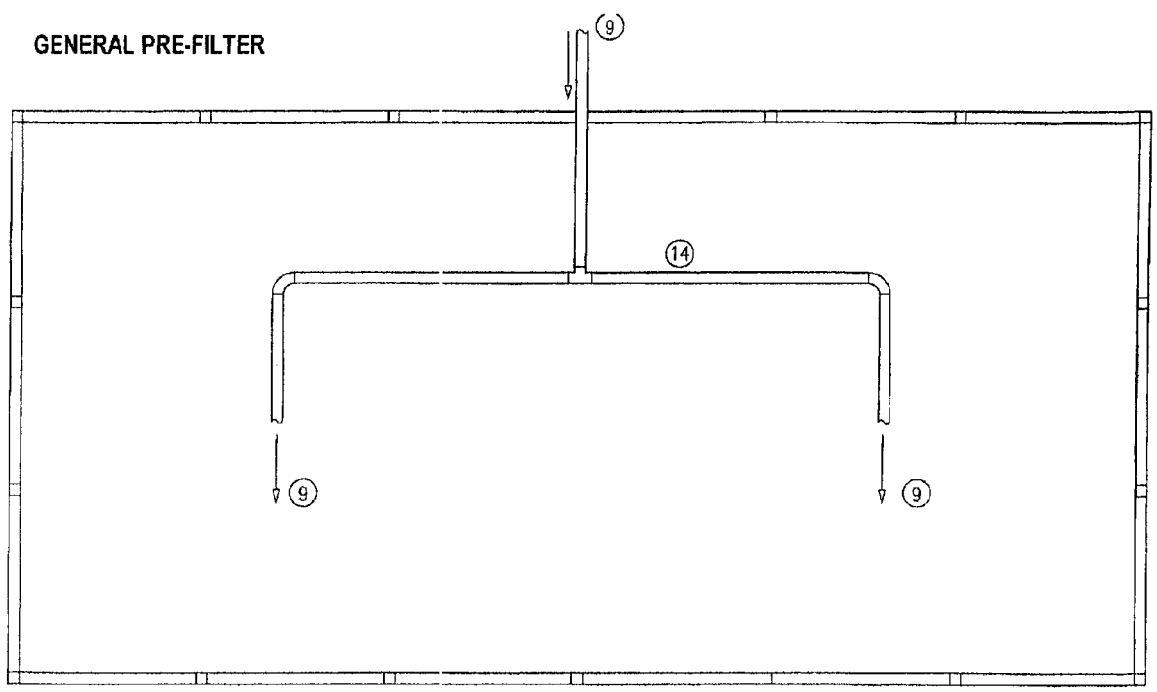
FIGURE No. 5
Plant View
Scale/ 1:100

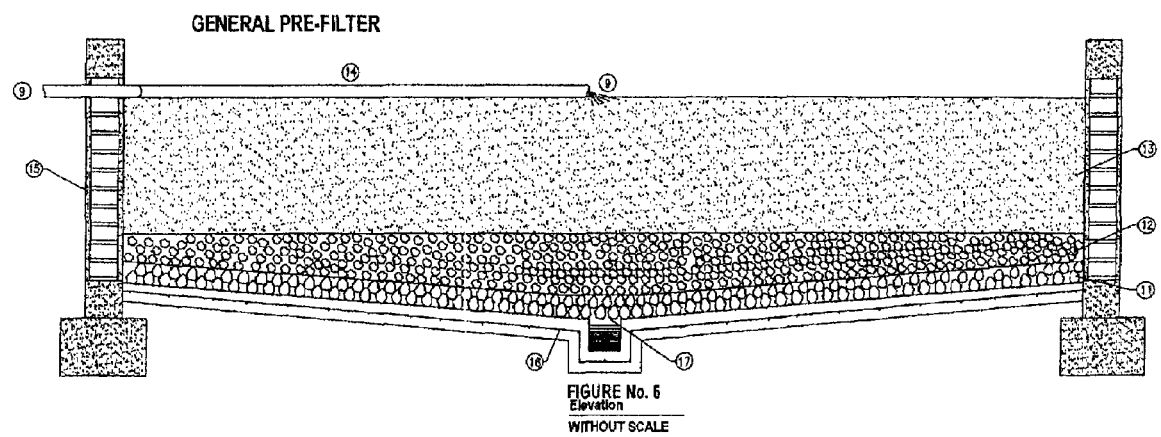
FIGURE No. 6
Elevation
WITHOUT SCALE

METHOD AND SYSTEM FOR INOCULATING BACTERIA IN CONTAMINATED WATER USING EARTHWORM HUMUS

CLAIM OF BENEFIT TO PRIOR APPLICATION

This patent application claims the benefit of U.S. Provisional Patent Application No. 60/855,099, filed Oct. 26, 2006, the contents of which are herein incorporated by reference in their entirety.

INTRODUCTION

The following description relates generally to a technique for treating contaminated water, and more particularly, to a technique using earthworms' humus to inoculate different types of bacteria. The technique can be performed using several types of mediums or fixation material. As described, the bacteria can be inoculated using different liquid or semi-liquid residues, which when in contact with the humus and with the medium material, begins to generate a bacterial flora specialized in degrading the type of liquid or semi-liquid residue that is being used.

BRIEF DESCRIPTION OF THE DRAWINGS

FIG. 1 illustrates a transversal view of the INOCULOM system showing the humus, the cellulose material, the stones and the double bottom.

FIG. 2 illustrates the INOCULOM system including layers that comprise the INOCULOM system.

FIG. 3 illustrates the in-flow of water and the layers that the water crosses over (humus, cellulose material, stones and double bottom), before being released by means of a pendent.

FIG. 4 illustrates the release of the water in the lower part of the INOCULOM system by using central canals that have a slope.

FIG. 5 shows the distribution of the water over the central pre-filter.

FIG. 6 shows the in-flow of water over the pre-filter and its flow in between different layers.

DETAILED DESCRIPTION

The disclosed bacteria flora inoculation process (INOCULUM) can be used for many possible applications, such as for cleaning sewer water (domestic), industrial water, or other water that presents organic contamination. With regard to industrial water, this technology may be applied to food industry-related residual waste, such as those produced by slaughterhouses, dairies, vineyards and agro industries. One advantage of the INOCULUM system is that it is triggered in the same way (using earthworm humus) for different types of liquid or semi-liquid wastes. For example, this system can be used for both slaughterhouse wastes and for dairy wastes.

Slaughterhouse liquid wastes are made up of mainly organic material, especially blood, green waters, excrement and fats, which are the main organic contaminants present at such industrial establishments. To degrade these types of waste in an organic form, it is necessary to form an active bacterial flora specialized in degrading (feeding upon) the organic material living in the residual waste of the slaughterhouse. The inoculation system disclosed herein is comprised of a recipient wherein sawdust and earthworm humus is located in its main part. Contaminated water is poured into its superior part and is passed through the sawdust and earthworm humus. It is in this contact that a bacterial flora specialized in degrading this type of liquid waste begins to form.

Dairy wastes are composed mainly of lactose, milk proteins, flour, vegetable fat, oil and biodegradable detergent, which are the main organic contaminants of this type of industry. As noted above, in order to degrade the organic material living in the water, the contaminated wastes must come in contact with earthworm humus in a sawdust medium.

In the aforesaid industrial applications, although different types of bacterial flora will form when the respective types of liquid wastes are contacted with the earthworm humus in the sawdust medium, both applications were processed in the same way.

In the bacterial inoculation process as described, it is preferable to separate the majority of solids suspended from the liquid waste, so as to avoid permeating the medium (sawdust) and damaging the formation of the bacterial flora. If there are too many solids accumulated in the sawdust medium, lagoons of contaminated water will be formed, which may provoke odors and an anaerobic (absence of oxygen) instead of an aerobic (presence of oxygen) bacterial flora will tend to form in the sawdust medium. Anaerobic bacterial flora provokes odor problems in the water that filters through the medium. If this happens, the water that is to be filtered will come out of the system with odors.

The medium that is be used to inoculate different bacterial flora is preferably a cellulose material, which can be present in different percentages in the medium (inoculation or fixation vehicle). For example, the medium could comprise 60% alfalfa and 40% cellulose material, or it can exist in other percentages. Most significantly, there must be a cellulose material percentage that serves as a shelter to the earthworm humus.

This bacterial flora inoculation method based on earthworm humus has as its main use the treatment of industrial liquid and semi-liquid wastes.

Use of INOCULUM in Contaminated Water Treatment.

The INOCULOM system is used to inoculate different bacterial flora depending on the liquid waste that is going to be used. As described above, if the liquid waste is from a dairy, then the bacterial flora that will be activated using the INOCULOM method is different than the one that will be activated to treat wastes of a vineyard or slaughterhouse.

The water used to inoculate the bacterial flora will be referred to as Primary Water (9). The term effluent (9) refers to water to be decontaminated in which the bacterial flora is already activated. Water that has already passed through the INOCULOM system will be called Affluent.

The INOCULOM method is composed of the following parts:

The INOCULOM method needs to be confined in a pond that has to be perforated in its inferior part in order to evacuate the Primary Water (9) that is being used to inoculate the bacterial flora. This Primary Water (9) is scattered in the superior part of the pond on a homogeneous form, with the intention of covering all the system, and it is collected by the inferior part. The Primary Water (9) could be used several times; however, this may depend on the amounts of disposal and the condition of the water flowing into the inferior part.

The Primary Water (9) that is distributed in the superior part of the pond passes on a gravitational form through all the layers of the INOCULOM system, and it is recollected in the inferior part of the pond by canals with slopes (7). This pond is made of walls that can be handcrafted, concrete, fiberglass, wood, steel, etc. There does not exist exactly a defined material to build a Bacteria Inoculator (INOCULOM), it is only necessary that there are walls capable of maintaining the medium material that makes up its interior. The floor (radier (4)) of the pond has also no defined material. Whatever material that meets the requirements may serve, for example, compression of the material that makes the Bacteria Inoculator (INOCULOM) and impermeability.

The Bacteria Inoculator (INOCULOM) is made of earthworm humus (from any type of earthworm) in its first layer (1) that is mixed with a cellulose material that may be sawdust, wood shavings, etc. (as shown in FIG. 1). This first layer also serves as a filter in case INOCULOM is used as a water treatment.

The earthworm humus (1) is the trigger to form different bacterial flora. As it is said, the main essence of the INOCULOM is to put in contact the earthworm humus and the liquid waste that is to be treated. This liquid waste can be sewer waste, liquid industrial wastes, etc.

The formation of the bacterial flora may be made in several layers of the INOCULOM, the main one being the first layer of sawdust and earthworm humus that is activated, and which is aerobic (presence of oxygen). On the other layer of inert material (rocks, plastic, etc.), whose main objective is to rapidly evacuate the water from the system, a bacterial flora needs to be formed.

The bacteria inoculation medium is the second layer of the system, which is made up of cellulose material (2) that can be sawdust or wood shavings. The thickness of this cellulose material is approximately 70 cms. deep, in which micro organisms produced by the earthworms' humus (1) and annelids (earthworms) inhabit together. Under this second layer there is a third layer of inert material, for example, quarry stones and rocks (3). On these further layers, a bacterial layer is also formed that serves to keep up degrading the organic material that the contaminated water (effluent 9) presents.

On the main medium of bacteria inoculation (2) (humus and sawdust), an ample bacterial flora is generated that, in case of using it to decontaminate water, may obtain a deep contamination removal. The following reductions can be obtained in sewer water: 95% of the biological demand of oxygen measurement (BDO), 93% of the volatile suspended solids, 96% of the volatile solids, 70% of nitrogen and 70% of phosphorus.

Earthworms of any kind (adults or juvenile (larvae)) can be added to the earthworm humus (1), which would increase the formation of humus because the earthworms are continuously defecating as they feed off of the organic material in the contaminated water retained in the first layers of the INOCULUM system. Therefore, in the earthworm humus (1), adult earthworms as well as larvae can be found in different species.

The sawdust (2) acts as the medium for the bacterial flora and, at the same time, as a food supplement for the earthworms in the eventual case that the contamination charge of the water may not be sufficient to feed them. The sawdust (2) serves as food source for the earthworms because it, in time, gets degraded by the action if the microorganisms. The earthworms normally feed their weight in one day.

The third layer of the medium is made up of quarry stones and rocks (3). Larger quarry stones and rocks are placed in the inferior part of the pond and smaller ones are placed in the superior part. A bacterial flora is formed on the rocks that digests the organic material present in the water that passes through it that was not retained in the superior layers of the Bacterial Inoculator.

The floor of the INOCULOM (as shown in FIGS. 2 and 4), also denoted as a double bottom, consists of a bottom (4) with certain inclination for the water to flow. On its top there exists blocks (5), which can be paving stones, concrete blocks or bricks, aside of the supports (6) that can be any resistant or inert material (stainless steel bars, bricks, paving stones, etc.). These blocks (5) can be in different sizes and separated by 2, 3, or 4 cms. The stones (3) are placed on top bigger than the support, principally the ones whose diameter is bigger than 4 cms. in order to prohibit the smaller stones from falling to the bottom. This double bottom has two functions: I) to hold the different layers of the system and II) to create a sole water guide in the form of a box that constitutes the treated water emitter (7), that is conducted to the exterior of the INOCULOM.

The double bottom is connected to a vent (10) which has as its main function oxygenating the inferior part of the INOCULOM. Vent (10) consists of a perforated tube in its inferior part and its upper part is open. This tube is located over the double bottom on the intersections of four blocks (5) and perforations are made in the inferior part which are not bigger than 1 inch of diameter. This vent permits an exchange of oxygen in the exterior part of the bottom of the INOCULOM.

The contaminated water distribution over the INOCULOM can be made in different ways, for example, using a PVC perforated pipe network (8) (as shown in FIG. 3), or sprinklers, fuzes, open channels, etc. The means used for the distribution of the contaminated water (9) are not very important. However, the distribution of the contaminated water over the filtering bed must be uniform. Any means that allows for uniform distribution over the filtering bed would fulfill this condition.

For the construction of the thick building of the Bacterial Inoculator (INOCULOM), there is no unique material that can be used. Any material (concrete, interknit, brick, etc.) existing on the market that has the impermeability and capacity characteristics to support the weight of the different layers of the INOCULOM can be used.

The INOCULOM used as a biological system in contaminated water treatment degrades all of the organic solids from the contaminated water, without producing unstable mud as can the rest of the traditional treatments.

The affluent 9 of the INOCULOM used as a water treatment has a very low absorption (is transparent) which permits the elimination of pathogenic microorganisms when later using any disinfection system (ultraviolet radiation, chlorine, ozone, etc.).

Before the contaminated water enters the INOCULOM used as a water treatment, the water has to be filtered, especially water containing Liquid Industrial Residues (Riles). The excess of solids suspended in contaminated water may overwhelm the system causing floods, which can possibly drown the earthworms or larvae in the INOCULOM, breaking the natural cycle of the continuous adding of earthworm humus to the INOCULOM system. To filter the contaminated water, different filtering systems can be used, for example, rotating filters, parabolic filters, decanters, etc. And to filter in a finer form, a sawdust-based system can be used, similar to the Bacterial Inoculator (INOCULOM) system, but without humus nor earthworms, which permits more water to pass per square meter. This filtering system will be named General Pre-Filter (P.G.) (FIGS. 5 and 6), composed of the following filtering layers: 1) In the inferior part of the layer are quarry stones or rocks (11) of from 2 to 4 inches in diameter, this layer having a thickness of 40 cms; 2) a gravel (12) layer, the gravel having a diameter of 0.5 inches and a layer thickness of 25 cms; and 3) shavings (13) are added after this layer, with a thickness of 55 cms from the gravel layer.

The contaminated water (9) over the General Pre-filter (P.G.) can be distributed (14) with perforated pipes, fuzes, sprinklers, or otherwise discharged over a part of the surface of the General Pre-filter (P.G.) so that the water is discharged over the General Pre-filter surface in a manner so as to reduce the probability of making holes in the surface. This General Pre-filter (P.G.) is confined inside a pond that has the same physical characteristics of the Bacterial Inoculator (INOCULOM), for example, walls can be built (15) from the General Pre-filter (P.G.) in craftsmanship of any of its types (bricks, blocks, etc.) and the radier (16) in armed concrete with slopes (17), that permits evacuation of the contaminated water that was disposed in the upper part through the inferior part of the General Pre-filter (P.G.).

State of Art in Contaminated Water Treatment.

The served water and Industrial residue organic liquid (RILES) treatment services are divided into two categories— anaerobic (absence of oxygen) and aerobic (presence of oxygen). For each of these categories, there exists a wide variety of treatments. For example, inside of the anaerobic, the most common are the anaerobic lagoon and the closed digester; and inside the aerobic, the most used are the denominated: activated mud and the pre-strained filters.

This new treatment based in the Bacteria Inoculator (INOCULOM) is an aerobic system since it needs oxygen to function correctly and, because it constitutes in a certain way a filtering medium, it can be classified as a Biological System for the Contaminated Water treatment based on a pre-straining filter modification.

Pre-Straining Filters

The traditional pre-straining filters are composed of stone supports, over which a certain flow of contaminated water lands through a distribution system. A bacterial flora with different types of microorganisms is formed in the stones coming from the contaminated water that direct the organic material. Yet the pre-straining traditional filters do not give the high index of organic material removal that the mud activated process gives; however, they have its advantages regarding space, energy and the capacity to resist disturbances.

The pre-straining filters have two big disadvantages, which are:

a) They Produce a Great Amount of Waste Mud.

The waste mud, as usual, reach from 0.22 to 0.66 lb of solids per lb of $DBO_5$ removed in a system of domestic water wastes. About industrial wastes, the production of mud can be as high as 0.4-0.5 lb/lb of $DBO_5$ removed if the content of carbohydrate waste is high, or as low as 0.05-0.1 lb/lb of $DBO_5$ removed if the organic materials are volatile acids or alcohols.

b) The Filtering Riverbed Gets Impermeable.

The rocks as well as the revolving disks get impermeable with the fat that the contaminated water contains. Due to this, the filter efficiency is reduced considerably. Treatment with active muds (aerobic system).

This treatment system is actually the most used because it is smaller and it operates with more elevated organic charges and in varied weather conditions. Commonly, the air is supplied through diffusers placed underneath the surfaces. In some plants, pure oxygen is supplied instead of air, which may reduce the volume of the incubator even more.

The most important disadvantages of this type of treatments are the following:

a) It Produces a Great Amount of Waste Mud.

The mud production is significantly greater than with other treatment systems, which entails a more complex operation of the plant. A portion of the waste muds are recycled over the aeration ponds and the other part has to be stabilized with some type of treatment.

b) Elevated Operational Costs.

This system requires that the aerators are constantly working in the ponds aerating or, supplying pure oxygen or air to the contaminated water, which results in a high consumption of energy.

Due to the complex muds methods, pumps are needed to suck muds from the bottom of the aeration ponds and transport them to places where they are going to be stabilized which adds considerable operating costs to the plant.

New Treatment Based on the Bacterial Inoculator (INOCULOM)

This new served water and liquid organic industrial wastes treatment system has the following ADVANTAGES:

a) It does not Produce Unstable Muds.

In the served water treatment and liquid organic industrial wastes traditional processes, solid subproducts (muds) are produced by the contaminant elimination of crude water, for which there has to be a secondary disposal.

The Bacterial Inoculator (INOCULOM) system degrades the totality of the organic solids coming from the contaminated water without producing unstable muds, unlike the rest of the traditional systems, because the earthworms in the medium of the Bacterial Inoculator (2) (humus and sawdust) degrade the totality of the solids that are retained in this means, transforming it into a stable, odorless material, like humus.

The sewer water treatment based on the Bacterial Inoculator (INOCULUM) does not require use of any type of solid organic decantor. It is only necessary to install a bar chamber to retain the inorganic solids coming from the sewage water which may cover the pipes or the distribution system.

b) The Filtering Riverbed does not Get Impermeable.

The Bacterial Inoculator medium (2) has a very important characteristic that distinguishes this new treatment system based on a Bacterial Inoculator (INOCULOM) from the others: it never gets overwhelmed because the bacterial flora and earthworms in the inoculation medium (sawdust and humus) which are constantly moving and making channels in the medium, allows the medium to always be porous and permeable. The solid inorganic materials that come with the served water, which may overwhelm or cover other filters, in this system, are digested by the earthworms and the bacterial flora.

c) Low Operational Costs.

The Bacterial Inoculator (INOCULOM) needs only impulsion pumps to distribute homogeneously the contaminated water over the upper surface of the Bacterial Inoculator (INOCULOM), drastically reducing energy costs in comparison to the traditional biological treatment systems, as the air or oxygen injection, as well as chemicals, need to be added to the contaminated water as well as other substances.

d) It Produces a Subproduct that can be Used as Natural Fertilizer.

Because earthworms are used in the inoculation medium, the organic material is degraded and earthworm humus is produced. The humus, which is a natural fertilizer, is extracted from the inoculator after some time.

The DISADVANTAGE of this new water treatment system based on Bacterial Inoculator (INOCULOM) is the following:

a) It is Sensitive to Organic Charge or Liquid Industrial Residues Variations in the Served Water.

The Bacterial Inoculator (INOCULOM) biological treatment system, is sensitive to variations in organic charges that may be produced in the affluent of this new treatment system (INOCULOM). Any considerable discharge of any chemically toxic substance, for example, acids, hydrocarbons, inorganic overcharge, etc., may damage this new treatment system (INOCULOM), killing the earthworms and bacterial flora.

The chemical products that are commonly used in homes, for clothes and bathroom cleansing, do not damage this new treatment system (INOCULOM). Still, a considerable amount is not discharged, because it is diluted in the rest of the used water.

I claim:

1. A method for treating contaminated liquid by forming bacteria flora using earthworm humus, comprising:
   distributing a contaminated liquid into the superior part of a containment tank;
   providing a layer of earthworm humus in the containment tank for filtering the contaminated liquid;
   providing a medium layer for bacteria inoculation below the earthworm humus layer in the containment tank; and
   providing a layer of an inert material below the medium layer proximate to the base of the containment tank, on which a bacterial layer is formed to continue degrading organic material in the contaminated liquid.

2. The method of claim 1, wherein the medium layer comprises a base of cellulose material.

3. The method of claim 1, wherein the medium layer comprises sufficient cellulose material to shelter earthworm humus.

4. The method of claim 1, wherein the medium layer acts as a medium for bacterial growth and formation of bacterial flora.

5. The method of claim 1, wherein the inert material comprises a plurality of stones or rocks.

6. The method of claim 1, wherein the inert material comprises plastic.

7. The method of claim 1, wherein the medium layer comprises sawdust or wood shavings.

8. The method of claim 1, wherein the medium layer is approximately 70 cm in thickness.

9. The method of claim 1, wherein the contaminated liquid comprises sewer water.

10. The method of claim 1, wherein the contaminated liquid comprises industrial water.

11. The method of claim 1, wherein the contaminated liquid comprises liquid waste.

12. The method of claim 1, wherein the liquid comprises semi-liquid waste.

13. The method of claim 1, further comprising generating the earthworm humus by adult earthworms.

14. The method of claim 1, further comprising generating the earthworm humus by larvae or juvenile earthworms.

15. A system for treating liquids by forming bacteria flora using earthworm humus, comprising:
   a containment tank for receiving a contaminated liquid distributed through an opening into the tank, the containment tank further comprising:
   a layer of earthworm humus through which the liquid is filtered;
   a medium layer for bacteria inoculation below the earthworm humus layer in the containment tank; and
   a layer of an inert material below the medium layer proximate to the base of the containment tank, on which a bacterial layer is formed that serves to continue degrading organic material in the contaminated liquid.

16. The system of claim 15, wherein the base of the containment tank is formed from an inert material.

17. The system of claim 15, further comprising an air chamber proximate to the floor of the containment tank, the air chamber being connected to the superior region of the tank by vertical tubes traversing a plurality of layers.

18. The system of claim 17, further comprising horizontal tubes that are connected to the exterior through the walls of the containment tank.

19. The system of claim 15, further comprising a layer comprising prefabricated concrete material, stones of different sizes or plastic for allowing an aerobic material and drainage of liquid to the exterior of the tank.

20. The system of claim 15, comprising combination of adult, juvenile, larvae and earthworm's eggs.

21. The system of claim 15, wherein the medium layer comprises a base of cellulose material.

22. The system of claim 15, wherein the tank further comprises an irrigation system for placing the contaminated liquid in contact with the earthworm humus layer.

23. The system of claim 15, wherein the containment tank is constructed so as to not accumulate liquid.

* * * * *